US011877109B2

(12) United States Patent
Cai

(10) Patent No.: US 11,877,109 B2
(45) Date of Patent: Jan. 16, 2024

(54) EARMUFF MODULE OF A HEADPHONE

(71) Applicant: Merry Electronics(Shenzhen) Co., Ltd., ShenZhen (CN)

(72) Inventor: Ming-Xue Cai, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 139 days.

(21) Appl. No.: 17/726,532

(22) Filed: Apr. 22, 2022

(65) Prior Publication Data

US 2023/0292025 A1 Sep. 14, 2023

(30) Foreign Application Priority Data

Mar. 8, 2022 (TW) ................................. 111108364

(51) Int. Cl.
*H04R 1/08* (2006.01)
*H04R 1/10* (2006.01)

(52) U.S. Cl.
CPC ............. *H04R 1/1008* (2013.01); *H04R 1/08* (2013.01); *H04R 1/1058* (2013.01)

(58) Field of Classification Search
CPC .......... H04R 1/08; H04R 1/083; H04R 1/086; H04R 1/1008; H04R 1/1058
See application file for complete search history.

(56) References Cited

U.S. PATENT DOCUMENTS

2010/0105447 A1* 4/2010 Sibbald ............ G10K 11/17857 381/71.6
2016/0100238 A1* 4/2016 Broadley ............. H04R 1/1008 381/371
2020/0368071 A1* 11/2020 Kara ...................... H04R 1/288
2022/0086549 A1* 3/2022 Hatfield ............... H04R 1/1091

* cited by examiner

*Primary Examiner* — Thang V Tran
(74) *Attorney, Agent, or Firm* — JCIPRNET

(57) ABSTRACT

An earmuff module of a headphone includes a back cover, a sound-receiving hole, a microphone assembly, and an earmuff. The back cover includes a peripheral side wall. The sound-receiving hole is formed on the peripheral side wall of the back cover and penetrates through the peripheral side wall. The microphone assembly is disposed on an inner surface of the peripheral side wall and corresponds to the sound-receiving hole, and is acoustically connected with the sound-receiving hole. The earmuff is detachably assembled on the back cover, and the earmuff includes a foam and a wrapping cover. The wrapping cover includes an extension part and a covering part. The covering part covers the foam. The extension part extends from one end of the covering part to an outer surface of the peripheral side wall and covers the sound-receiving hole. The microphone assembly is located within a range covered by the extension part.

9 Claims, 10 Drawing Sheets

EARMUFF MODULE OF A HEADPHONE

CROSS-REFERENCE TO RELATED APPLICATION

This application claims the priority benefit of Taiwan application serial no. 111108364, filed on Mar. 8, 2022. The entirety of the above-mentioned patent application is hereby incorporated by reference herein and made a part of this specification.

BACKGROUND

Technical Field

The disclosure relates to an earmuff module, and more particularly, to an earmuff module of a headphone.

Description of Related Art

Most of the headphones on the market are equipped with earmuffs attached to ears of a user and a microphone with a sound-receiving function in order to emphasize the comfort of the user when wearing the headphones and the convenience of the voice communication. However, in the design of the headset microphone, in order to consider the convenience of replacing the earmuffs, the microphone is disposed at a position away from a mouth of the user, so that the microphone is prone to poor sound reception due to the far distance. Therefore, how to improve the design of the headphone such that the earmuffs may be easily replaced while improving the sound-receiving effect of the microphone is an issue in the art to work on.

SUMMARY

The disclosure provides an earmuff module of a headphone, in which a user may replace the earmuff conveniently, and a microphone has a good sound-receiving effect.

An earmuff module of a headphone in the disclosure includes a back cover, a sound-receiving hole, a microphone assembly, and an earmuff. The back cover includes a peripheral side wall. The sound-receiving hole is formed on the peripheral side wall of the back cover and penetrates through the peripheral side wall. The microphone assembly is disposed on an inner surface of the peripheral side wall and corresponds to the sound-receiving hole, and is acoustically connected with the sound-receiving hole. The earmuff is detachably assembled on the back cover, and the earmuff includes a foam and a wrapping cover. The wrapping cover includes an extension part and a covering part. The covering part covers the foam. The extension part extends from one end of the covering part to an outer surface of the peripheral side wall and covers the sound-receiving hole, and the microphone assembly is located within a range covered by the extension part.

In an embodiment of the disclosure, the back cover includes a positioning recess, and the extension part includes an elastic end extending into the positioning recess.

In an embodiment of the disclosure, the back cover includes a first casing and a second casing. The first casing is away from the earmuff, and the second casing includes the peripheral side wall and the sound-receiving hole.

In an embodiment of the disclosure, the positioning recess is formed between the first casing and the second casing.

In an embodiment of the disclosure, the back cover includes at least one first engaging part. The earmuff includes at least one second engaging part corresponding to the first engaging part. The extension part covers the at least one first engaging part and the at least one second engaging part.

In an embodiment of the disclosure, the at least one first engaging part is multiple. The at least one second engaging part is multiple. The first engaging parts are disposed at equal intervals, and the first engaging parts are detachably fixed to the second engaging parts.

In an embodiment of the disclosure, the at least one second engaging part is located beside a portion of the extension part close to the covering part.

In an embodiment of the disclosure, the back cover includes an accommodating convex cavity formed on the peripheral side wall. The sound-receiving hole is located on the accommodating convex cavity, and the microphone assembly is located in the accommodating convex cavity.

In an embodiment of the disclosure, the earmuff module of the headphone further includes a front cover fixed to the back cover. The earmuff covers the front cover, and the microphone assembly is located between the front cover and the back cover.

Based on the above, in the earmuff module of the headphone in the disclosure, the microphone assembly is located on the inner surface of the peripheral sidewall, and the extension part of the earmuff is located on the outer surface of the peripheral sidewall. In this way, the operation of the microphone assembly is not affected when the user replaces the earmuff, and thus the earmuff may be easily replaced. In addition, the microphone assembly in the disclosure is located on the inner surface of the peripheral wall close to the mouth of the user, and the voice of the user may be clearly recorded by the microphone assembly. Therefore, the microphone assembly has a good performance in terms of sound reception.

DETAILED DESCRIPTION OF DISCLOSED EMBODIMENTS

Figure 1:
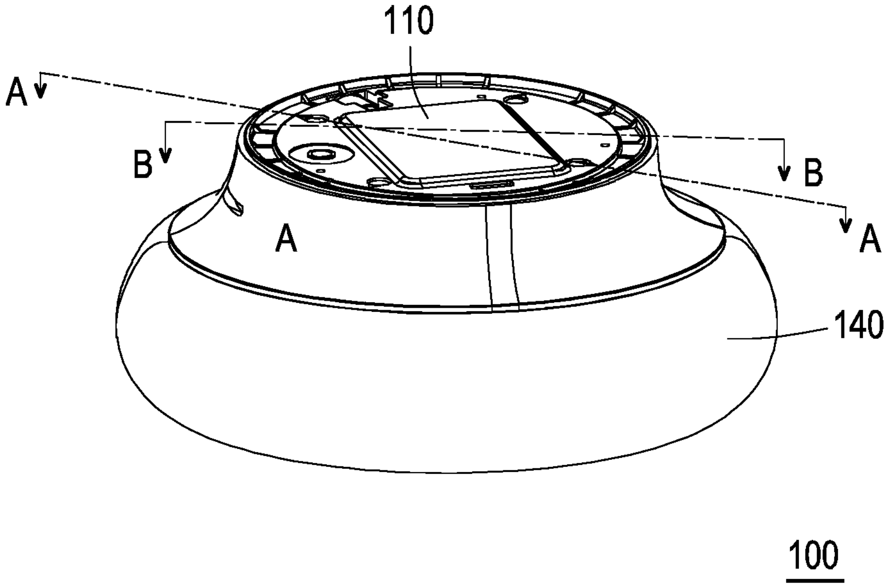
FIG. 1 is a perspective view of an earmuff module of a headphone according to an embodiment of the disclosure.
Figure 2:
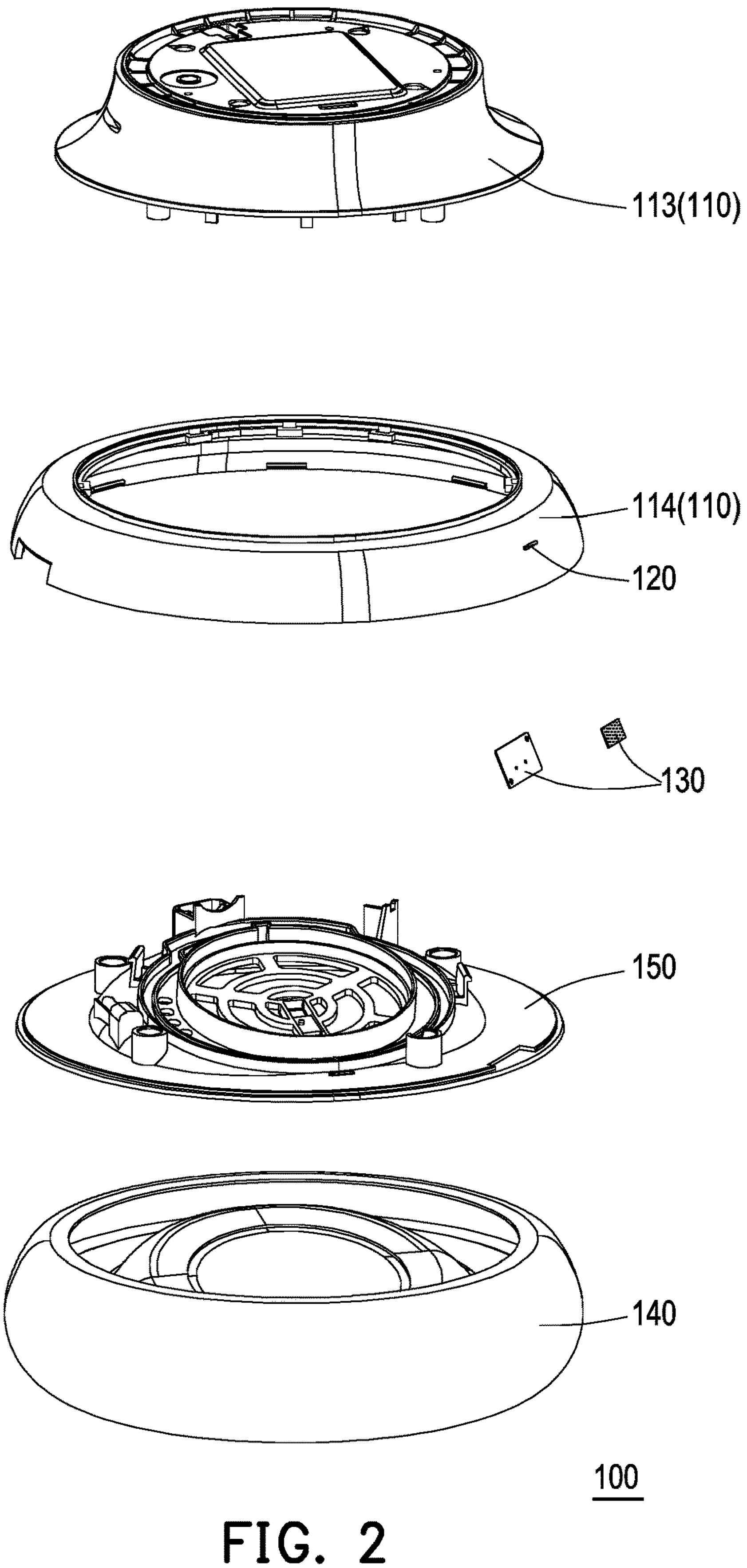
FIG. 2 is an exploded view of the earmuff module of FIG. 1.
Figure 3A:
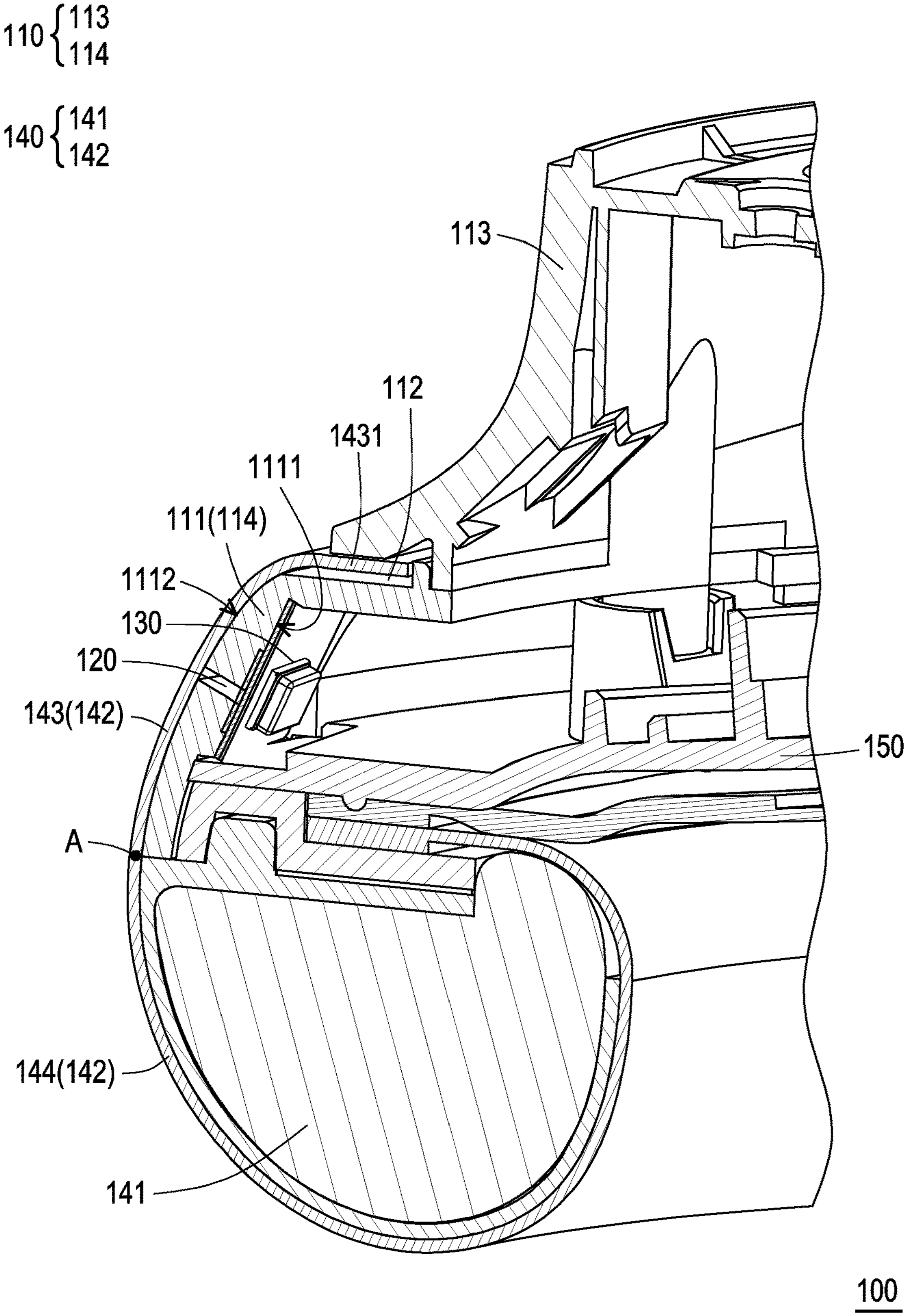
FIG. 3A is a partial cross-sectional view taken along a line A-A of FIG. 1.

FIG. 1 is a perspective view of an earmuff module of a headphone according to an embodiment of the disclosure. FIG. 2 is an exploded view of the earmuff module of FIG. 1. FIG. 3A is a partial cross-sectional view taken along a line A-A of FIG. 1.

Referring to FIGS. 1 to 3A, an earmuff module 100 in this embodiment includes a back cover 110, a sound-receiving hole 120 (FIG. 2), a microphone assembly 130 (FIG. 2), and an earmuff 140. The back cover 110 includes a first casing 113 and a second casing 114. The first casing 113 is away from the earmuff 140, and the second casing 114 includes a peripheral side wall 111 (FIG. 3A) and the sound-receiving hole 120. The sound-receiving hole 120 is formed on the peripheral side wall 111 of the second casing 114 and penetrates through the peripheral side wall 111. The microphone assembly 130 is disposed on an inner surface 1111 (FIG. 3A) of the peripheral side wall 111 and corresponds to the sound-receiving hole 120, and is acoustically connected with the sound-receiving hole 120. The earmuff 140 is detachably assembled on the back cover 110.

The earmuff 140 in this embodiment includes a foam 141 (FIG. 3A) and a wrapping cover 142 (FIG. 3A). The wrapping cover 142 includes an extension part 143 (FIG. 3A) and a covering part 144 (FIG. 3A). There is a juncture A as shown in FIG. 3A between the extension part 143 and the covering part 144. The covering part 144 covers the foam 141. The extension part 143 extends from one end of the covering part 144 adjacent to the juncture A to an outer surface 1112 of the peripheral side wall 111 and covers the sound-receiving hole 120, and the microphone assembly 130 is located within a range covered by the extension part 143.

In the earmuff module 100 in this embodiment, under the above configuration, the sound-receiving hole 120 is located on the back cover 110 beside the earmuff 140, and the microphone assembly 130 and the extension part 143 of the earmuff 140 are respectively disposed on the inner surface 1111 and the outer surface 1112 relative to two sides of the sound-receiving hole 120. Compared with the conventional earmuff module in which elements such as the sound-receiving hole and the microphone are disposed at positions away from a mouth of a user in order to maintain the convenience of replacing the earmuff, the sound-receiving hole 120 and the microphone assembly 130 in this embodiment have a good sound-receiving effect because the sound-receiving hole 120 and the microphone assembly 130 are close to the mouth of the user.

In addition, the microphone assembly 130 is also disposed on the inner surface 1111 of the back cover 110. The user only removes the extension part 143 on the outer surface 1112 together with the covering part 144 from the back cover 110 when replacing the earmuff 140, and an operation of the microphone assembly 130 is not affected during a replacement process. Therefore, the earmuff 140 may be easily replaced. Furthermore, after the sound-receiving hole 120 is covered by the extension part 143, a shape and a position of the sound-receiving hole 120 is not exposed to a line-of-sight coverage of the user, which has an effect of making an appearance of the earmuff module 100 more beautiful.

In this embodiment, the back cover 110 of the earmuff module 100 includes a positioning recess 112 (FIG. 3A). The extension part 143 includes an elastic end 1431 extending into the positioning recess 112. The positioning recess 112 is formed between the first casing 113 and the second casing 114 as shown in FIG. 3. After the elastic end 1431 extends into the positioning recess 112 and is clamped by the first casing 113 and the second casing 114, the wrapping cover 142 is sufficiently tensioned, so that the covering part 144 may flatly covers and is attached to the foam 141. In addition, the extension part 143 may also be flatly attached to the outer surface 1112 of the peripheral side wall 111, so as to enhance a covering effect provided by the wrapping cover 142 and make a shape of the overall wrapping cover 142 flat and beautiful.

Further, the extension part 143 in this embodiment is formed by mesh fabric, and a portion of the extension part 143 close to the elastic end 1431 is required to have elasticity, so as to achieve a function of being compressible and enhance the covering effect of the extension part 143. The portion of the extension part 143 close to the elastic end 1431 in this embodiment may be combined with elastic thermoplastic polyurethane (TPU). However, in other embodiments of the disclosure, the portion of the extension part 143 close to the elastic end 1431 may also be combined with elastic rubber, and the disclosure is not limited thereto.

In addition, the extension part 143 in this embodiment is required to have a good sound-penetrating effect in an area adjacent to the sound-receiving hole 120. After the extension part 143 is combined with materials such as thermoplastic polyurethane, the sound-receiving effect of the microphone assembly 130 located on the inner surface 1111 of the sound-receiving hole 120 is affected. Therefore, the extension part 143 is not combined with the materials such as thermoplastic polyurethane in the area adjacent to the sound-receiving hole 120, so as to ensure that the microphone assembly 130 may receive sound well.

Figure 3B:
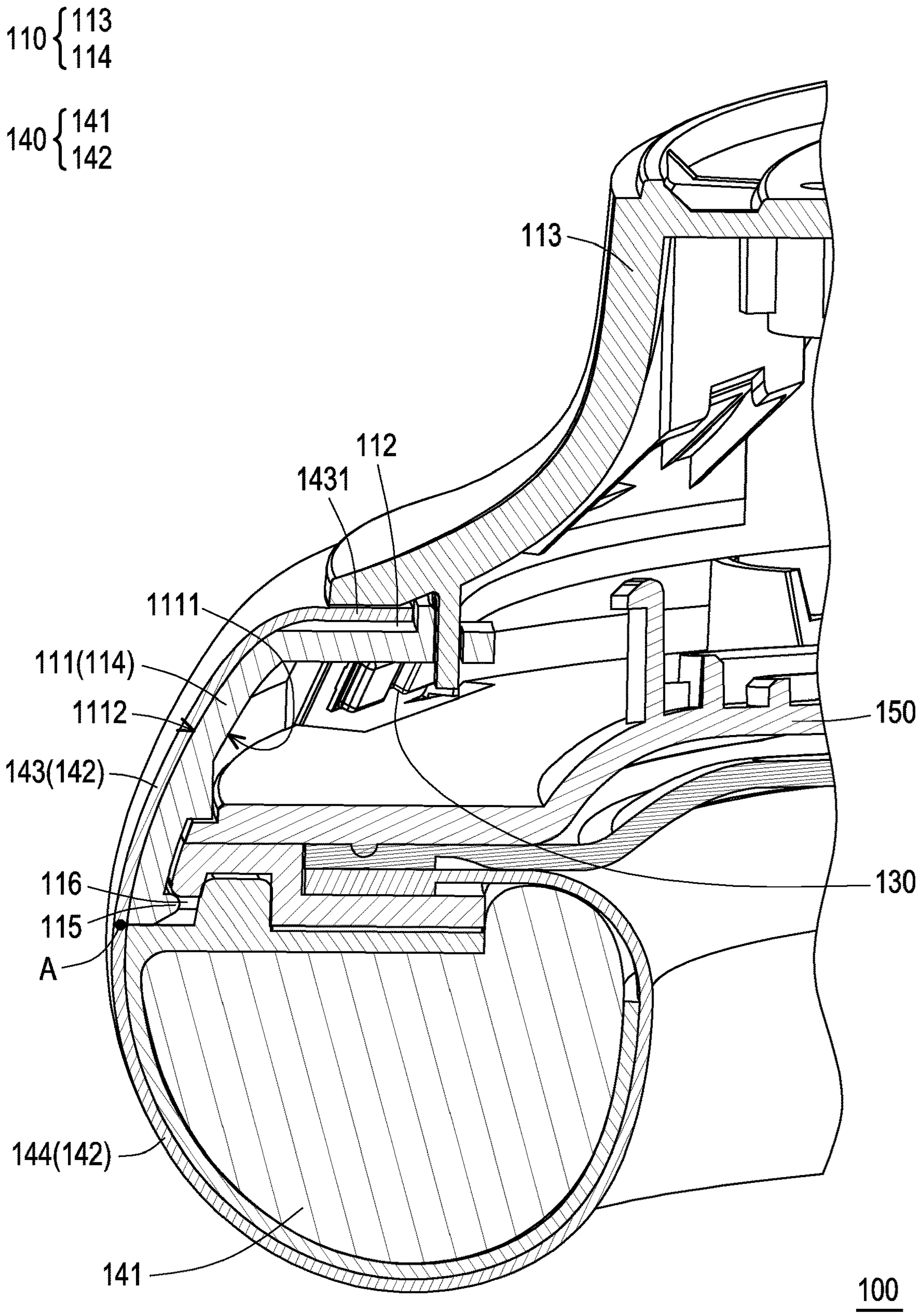
FIG. 3B is a partial cross-sectional view taken along a line B-B of FIG. 1.

FIG. 3B is a partial cross-sectional view taken along a line B-B of FIG. 1. Referring to FIGS. 1 and 3B, the second casing 114 of the back cover 110 in this embodiment includes at least one first engaging part 115, and the earmuff 140 includes at least one second engaging part 116 corresponding to the first engaging part 115. When the back cover 110 is combined with the earmuff 140 as shown in FIG. 1, the first engaging part 115 is engaged with and fixed to the second engaging part 116, so that both the back cover 110 and the earmuff 140 are not easily separated, and the extension part 143 may cover the first engaging part 115 and the second engaging part 116 as shown in FIG. 3B. In this embodiment, the first engaging part 115 is multiple, and the second engaging part 116 is multiple. The first engaging parts 115 are disposed at equal intervals on a side of the inner surface 1111, and the first engaging parts 115 are detachably fixed to the second engaging parts 116. In detail, the second engaging parts 116 are located beside a portion of the extension part 143 close to the covering part 144, which is adjacent to a position of the juncture A shown in FIG. 3B. It is worth mentioning that the first engaging part 115 in this embodiment is a male buckle with a convex shape, and the second engaging part 116 is a female buckle with a concave shape. However, in other embodiments of the disclosure, the first engaging part 115 may be the female buckle with the concave shape, and the second engaging part 116 may be the male buckle with the convex shape. The disclosure is not limited thereto.

Referring to FIGS. 2 and 3B, the earmuff module 100 in this embodiment further includes a front cover 150. After the front cover 150 corresponds to the back cover 110, the front cover 150 is combined with and fixed to the back cover 110. As shown in FIG. 3B, the earmuff 140 is assembled on the back cover 110 and covers the front cover 150, and the microphone assembly 130 is located between the front cover 150 and the back cover 110.

Figure 4A:
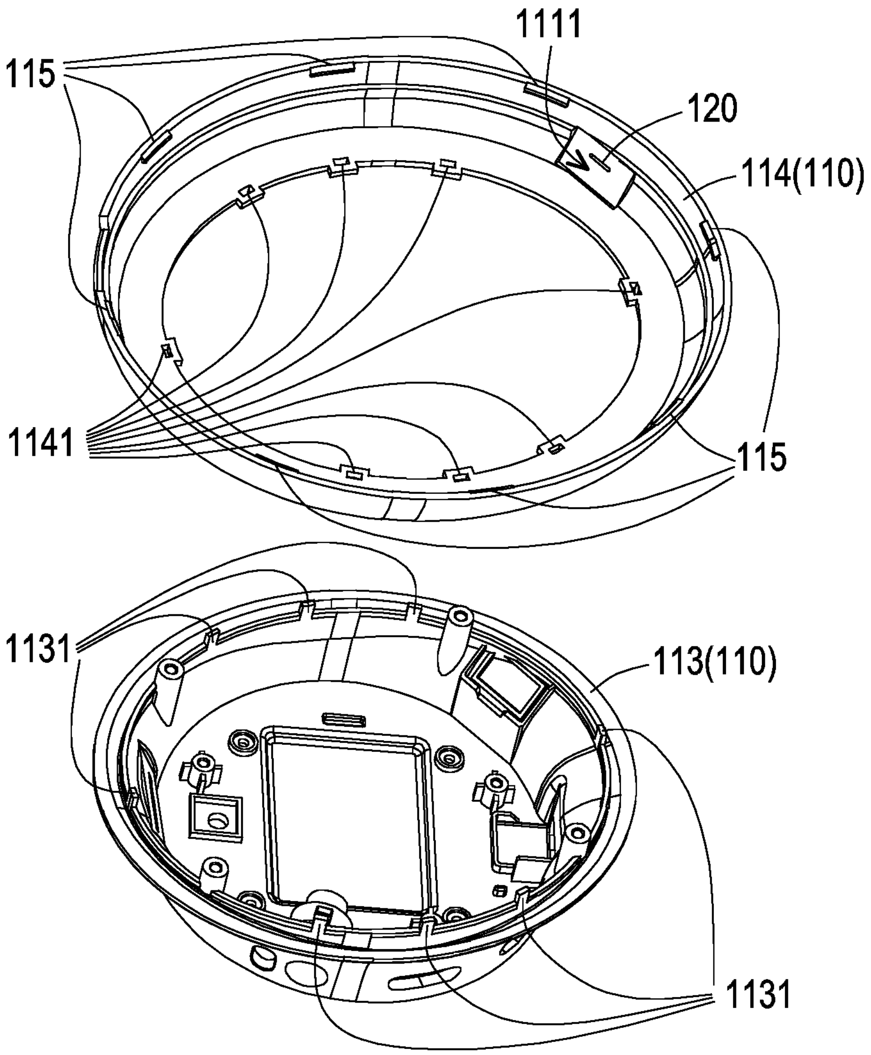
FIGS. 4A to 4B are assembly flowcharts of the earmuff module of FIG. 1.
Figure 4B:
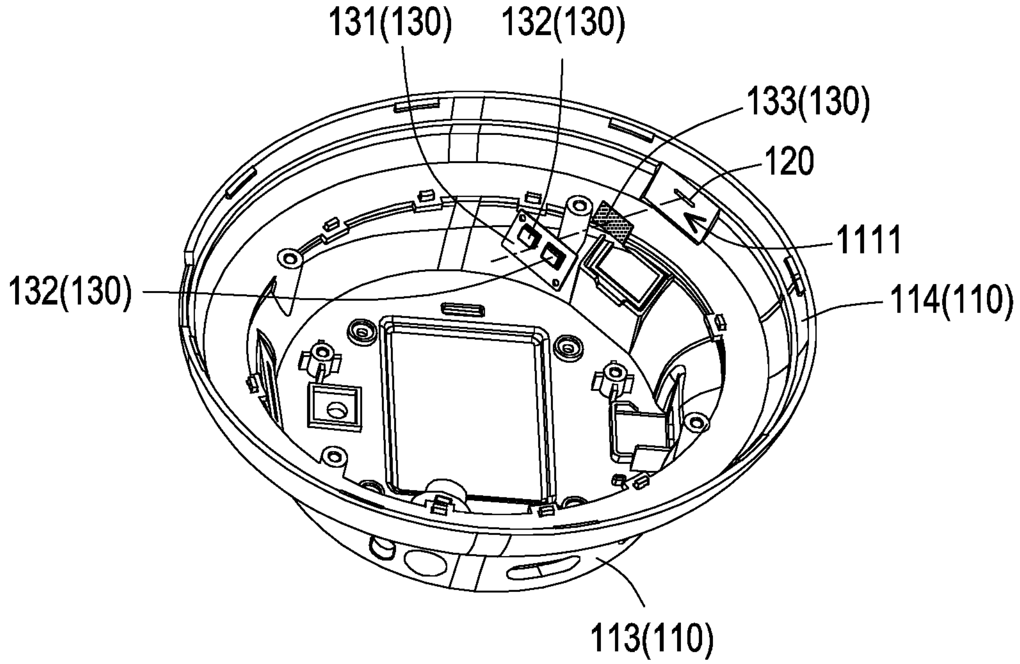

FIGS. 4A to 4B are assembly flowcharts of the earmuff module of FIG. 1. Referring to FIGS. 4A to 4B, the first casing 113 of the back cover 110 in this embodiment has multiple alignment convex parts 1131, and the second casing 114 has multiple alignment grooves 1141. After the alignment convex parts 1131 of the first casing 113 are aligned with the alignment grooves 1141 of the second casing 114, the first casing 113 and the second casing 114 are integrated as shown in FIG. 4B. The microphone assembly 130 is disposed on the inner surface 1111 of the second casing 114 after corresponding to the sound-receiving hole 120 on the inner surface 1111 of the second casing 114 as shown in FIG. 4B.

Figure 5:
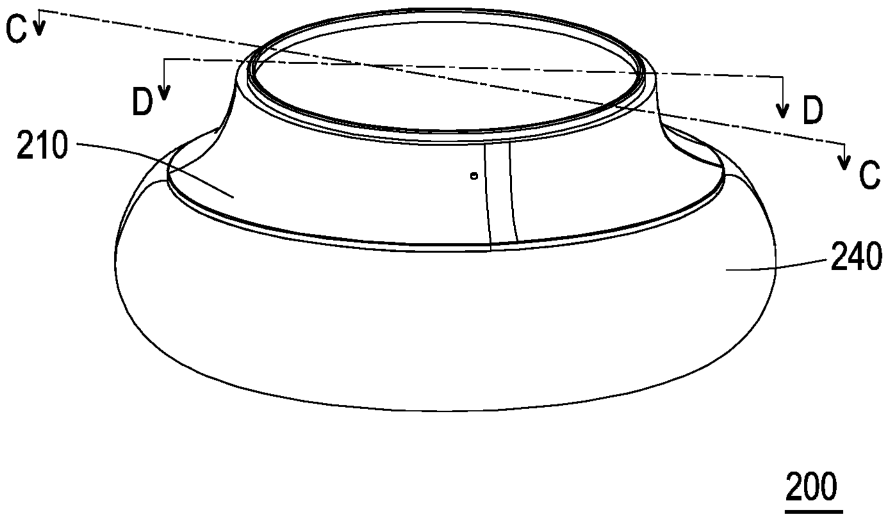
FIG. 5 is a perspective view of an earmuff module of a headphone according to another embodiment of the disclosure.
Figure 6:
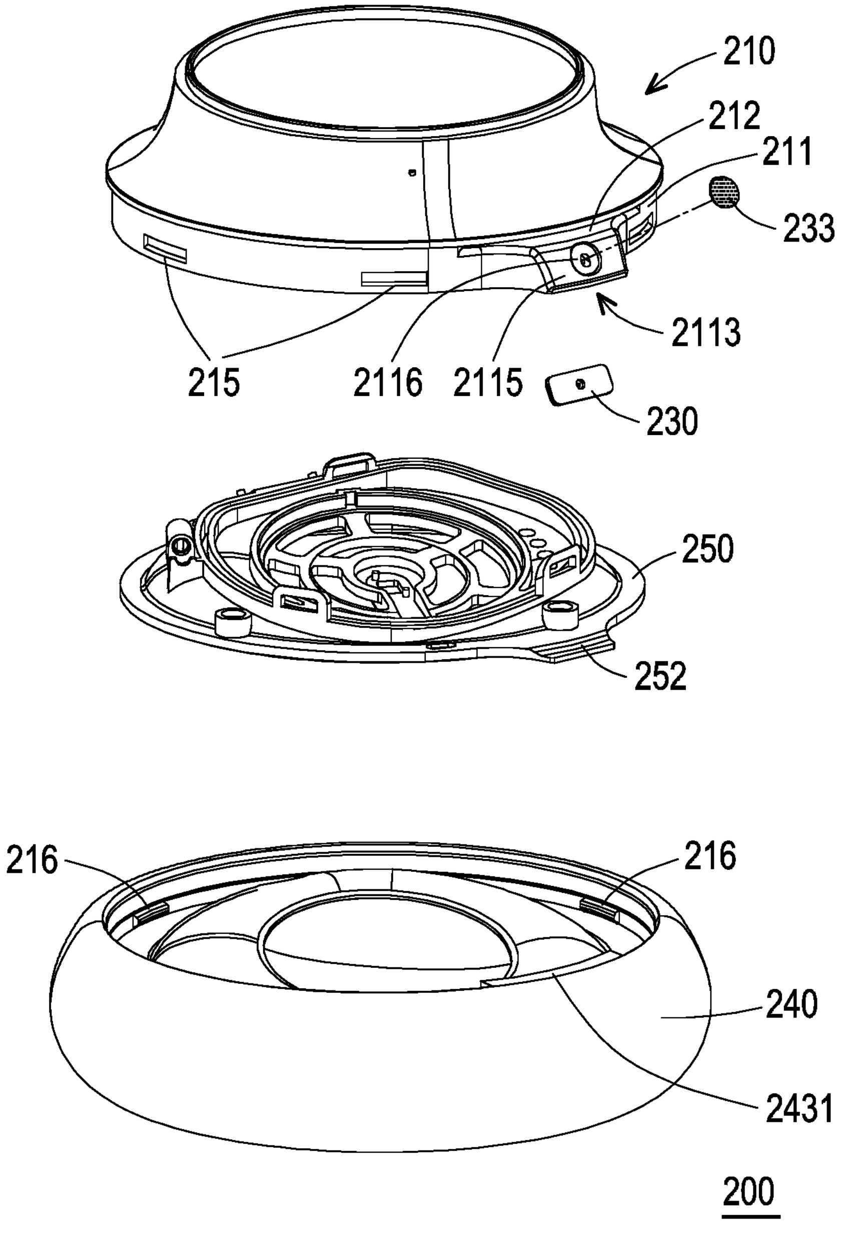
FIG. 6 is an exploded view of the earmuff module of FIG. 5.
Figure 7A:
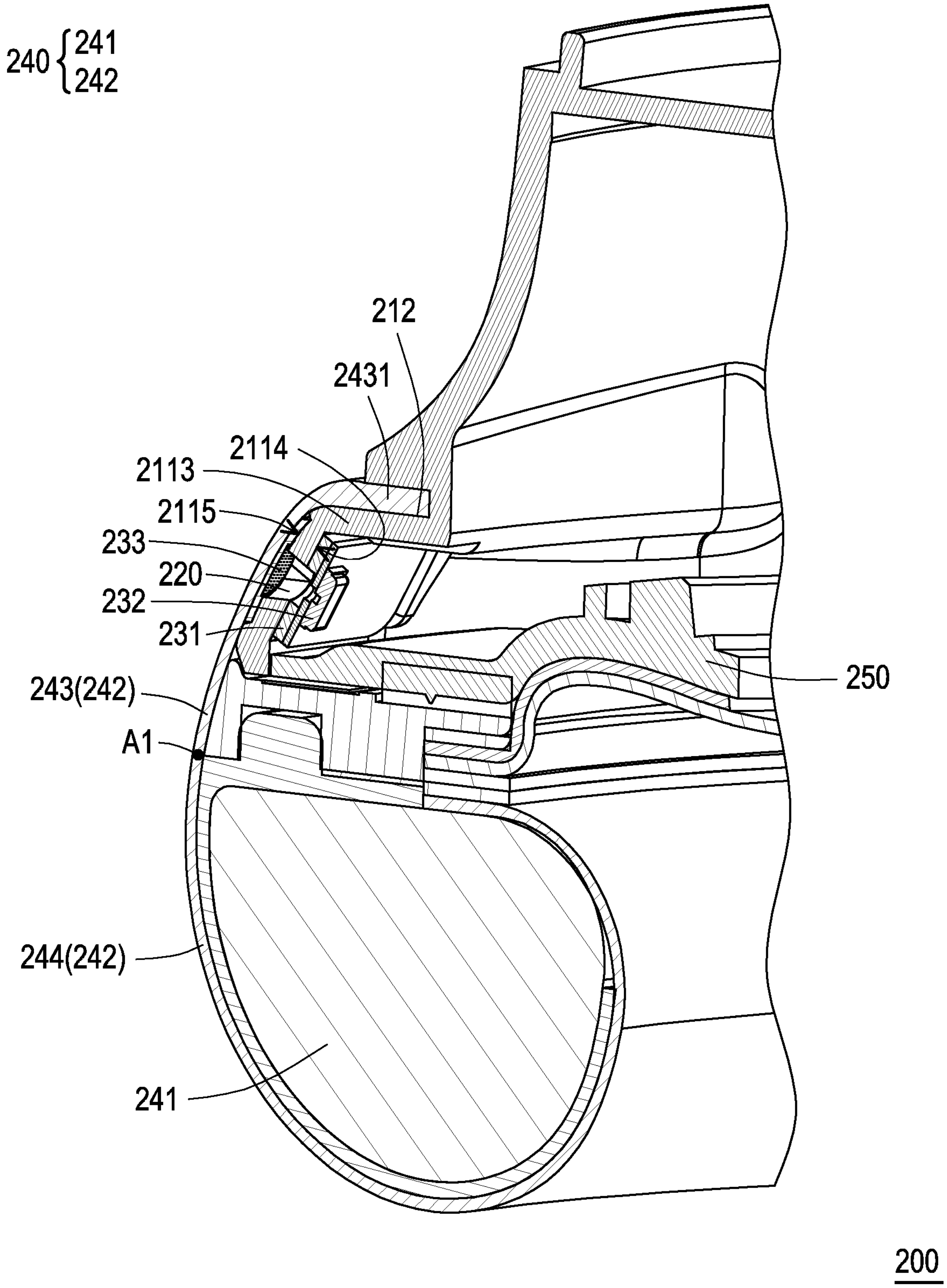
FIG. 7A is a partial cross-sectional view taken along a line C-C of FIG. 5.

FIG. 5 is a perspective view of an earmuff module of a headphone according to another embodiment of the disclosure. FIG. 6 is an exploded view of the earmuff module of FIG. 5. FIG. 7A is a partial cross-sectional view taken along a line C-C of FIG. 5.

Referring to FIGS. 5 to 7A, a difference between an earmuff module 200 in another embodiment of the disclosure and the earmuff module 100 is that a back cover 210 is integrally formed as shown in FIG. 6, and the back cover 210 includes an accommodating convex cavity 2113 formed on a peripheral side wall 211. A sound-receiving hole 220 is located on the accommodating convex cavity 2113, and a microphone assembly 230 is located in the accommodating convex cavity 2113. A microphone body 232 of the microphone assembly 230 is located on one side of a circuit board 231, and another side of the circuit board 231 is attached to an inner surface 2114 of the accommodating convex cavity 2113. An outer surface 2115 of the accommodating convex cavity 2113 has a groove 2116 (FIG. 6), and a mesh structure 233 is adapted to be aligned and attached to the groove 2116.

In addition, a front cover 250 in this embodiment has a convex edge 252. A position of the convex edge 252 corresponds to the accommodating convex cavity 2113 of the back cover 210, so as to provide a mutual positioning effect between the front cover 250 and the back cover 210. A position of a positioning recess 212 corresponds to the accommodating convex cavity 2113, and the positioning recess 212 have the same range as an elastic end 2431 of an extension part 243.

Figure 7B:
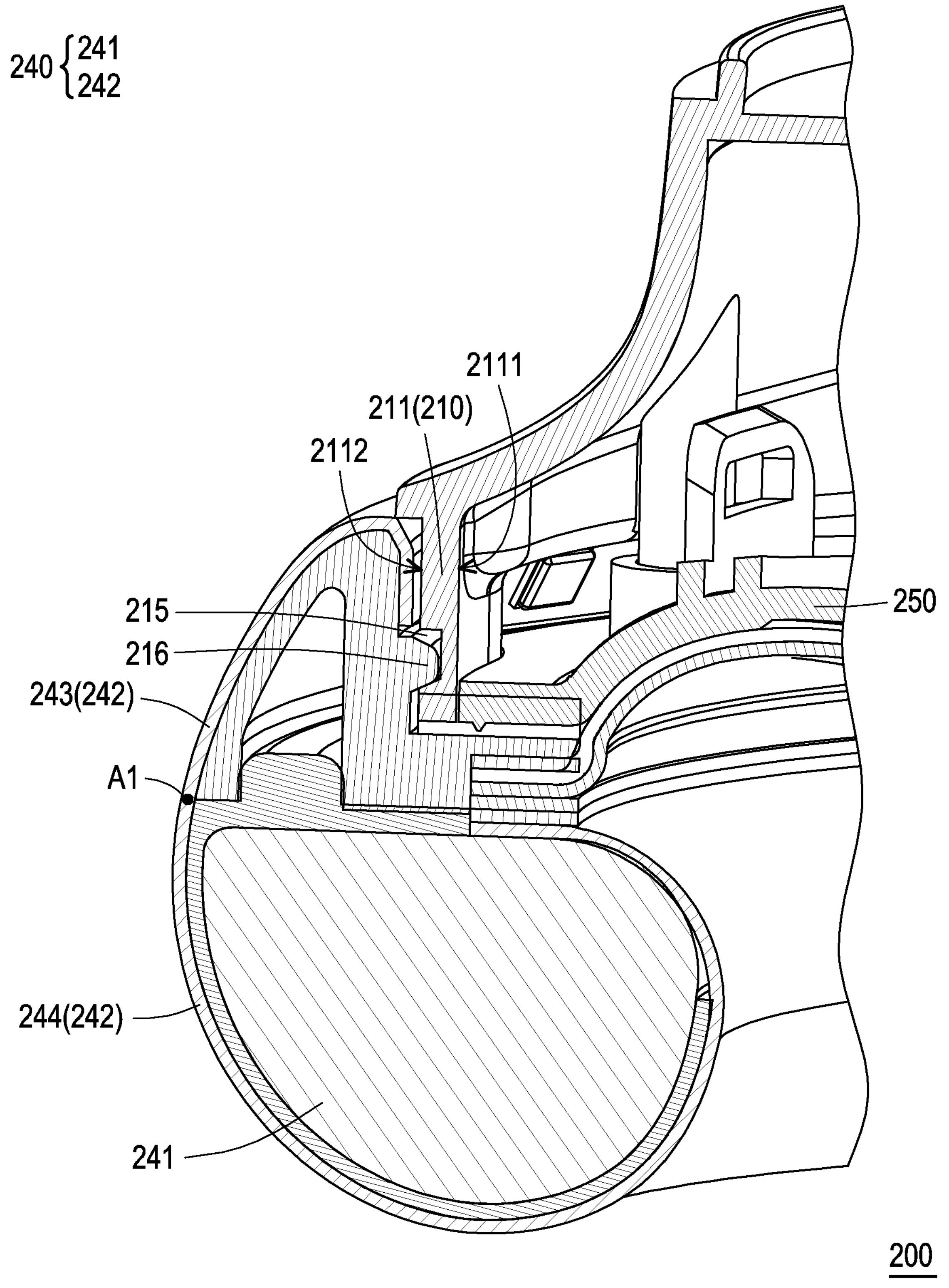
FIG. 7B is a partial cross-sectional view taken along a line D-D of FIG. 5.

FIG. 7B is a partial cross-sectional view taken along a line D-D of FIG. 5. Referring to FIGS. 6 and 7B, a first engaging part 215 in another embodiment of the disclosure is the female buckle with the concave shape, and a second engaging part 216 is the male buckle with the convex shape. However, in other embodiments of the disclosure, the first engaging part 215 may be the male buckle with the convex shape, and the second engaging part 216 may be the female buckle with the concave shape. The disclosure is not limited thereto.

Based on the above, in the earmuff module of the disclosure, the sound-receiving hole is disposed on the back cover beside the earmuff, and the microphone assembly and the extension part of the earmuff are respectively disposed on the inner surface and the outer surface of the sound-receiving hole. When the user replaces the earmuff, the microphone assembly is located on the inner surface of the sound-receiving hole, so the user does not touch the microphone assembly or interfere with the operation of the microphone assembly, so as to maintain the convenience of replacing of the earmuff. The sound-receiving hole also has the good sound-receiving effect because the position of the sound-receiving hole is close to the mouth of the user, and the sound-receiving hole is not exposed to the line-of-sight coverage of the user after being covered by the extension part, which has the effect of making the appearance of the earmuff module more beautiful. In addition, through the design of the positioning recess in the earmuff module of one embodiment, after the elastic end of the extension part extends into the positioning recess, the elastic end of the extension part may be clamped by the positioning recess, and the wrapping cover may be sufficiently tensioned. The extension part may be flatly attached to the outer surface of the peripheral side wall, which enhances the covering effect provided by the wrapping cover and makes the shape of the overall wrapping cover flat and beautiful.

What is claimed is:

1. An earmuff module of a headphone, wherein the earmuff module comprises:

a back cover comprising a peripheral side wall;

a sound-receiving hole formed on the peripheral side wall of the back cover and penetrating through the peripheral side wall;

a microphone assembly disposed on an inner surface of the peripheral side wall and corresponding to the sound-receiving hole, and acoustically connected with the sound-receiving hole; and an earmuff detachably assembled on the back cover and comprising a foam and a wrapping cover, wherein the wrapping cover comprises an extension part and a covering part, the covering part covers the foam, the extension part extends from one end of the covering part to an outer surface of the peripheral side wall and covers the sound-receiving hole, and the microphone assembly is located within a range covered by the extension part.

2. The earmuff module according to claim 1, wherein the back cover comprises a positioning recess, and the extension part comprises an elastic end extending into the positioning recess.

3. The earmuff module according to claim 2, wherein the back cover comprises a first casing and a second casing, the first casing is away from the earmuff, and the second casing comprises the peripheral side wall and the sound-receiving hole.

4. The earmuff module according to claim 3, wherein the positioning recess is formed between the first casing and the second casing.

5. The earmuff module according to claim 1, wherein the back cover comprises at least one first engaging part, the earmuff comprises at least one second engaging part corresponding to the first engaging part, and the extension part covers the at least one first engaging part and the at least one second engaging part.

6. The earmuff module according to claim 5, wherein the at least one first engaging part is plural, the at least one second engaging part is plural, the first engaging parts are disposed at equal intervals, and the first engaging parts are detachably fixed to the second engaging parts.

7. The earmuff module according to claim 5, wherein the at least one second engaging part is located beside a portion of the extension part close to the covering part.

8. The earmuff module according to claim 1, wherein the back cover comprises an accommodating convex cavity formed on the peripheral side wall, the sound-receiving hole is located on the accommodating convex cavity, and the microphone assembly is located in the accommodating convex cavity.

9. The earmuff module according to claim 1, further comprising a front cover fixed to the back cover, wherein the earmuff covers the front cover, and the microphone assembly is located between the front cover and the back cover.

* * * * *